(12) United States Patent
Li

(10) Patent No.: US 11,663,440 B1
(45) Date of Patent: May 30, 2023

(54) RADIO FREQUENCY IDENTIFICATION SWITCH TAG

(71) Applicant: Bing Xuan Li, Hsinchu (TW)

(72) Inventor: Bing Xuan Li, Hsinchu (TW)

( * ) Notice: Subject to any disclaimer, the term of this patent is extended or adjusted under 35 U.S.C. 154(b) by 0 days.

(21) Appl. No.: 18/075,965

(22) Filed: Dec. 6, 2022

(30) Foreign Application Priority Data

May 19, 2022 (CN) .......................... 2022105548106

(51) Int. Cl.
*G06K 19/06* (2006.01)
*G06K 19/077* (2006.01)

(52) U.S. Cl.
CPC .............................. *G06K 19/07794* (2013.01)

(58) Field of Classification Search
CPC ................................................ G06K 19/07794
USPC ......................................................... 235/492
See application file for complete search history.

(56) References Cited

U.S. PATENT DOCUMENTS

| 5,049,728 A | * | 9/1991 | Rovin ................... H05K 3/325 235/487 |
| 2009/0112761 A1 | * | 4/2009 | Robertson ............. G07F 7/0833 705/41 |
| 2016/0342821 A1 | * | 11/2016 | Nyalamadugu .... G06K 7/10346 |
| 2022/0253660 A1 | | 8/2022 | Nyalamadugu et al. |

FOREIGN PATENT DOCUMENTS

CN          114819031 A        7/2022

* cited by examiner

*Primary Examiner* — Jamara A Franklin
(74) *Attorney, Agent, or Firm* — Zhigang Ma

(57) ABSTRACT

A radio frequency identification (RFID) switch tag exemplarily includes: a housing; a detachable card including: a booster antenna, and at least one ultra-high frequency RFID module uncoupled to the booster antenna when the detachable card is detached from the housing; and a coupling coil, configured to couple the booster antenna with one of the at least one ultra-high frequency RFID module when the detachable card is attached to the housing. The RFID switch tag may have complete functions, the RFID switch tag is detachable and convenient in use, and the RFID switch tag can be applied in various scenarios.

18 Claims, 7 Drawing Sheets

RADIO FREQUENCY IDENTIFICATION SWITCH TAG

CROSS REFERENCE OF RELATED APPLICATION

This application claims priority and benefit to a patent application No. 202210554810.6, filed to China National Intellectual Property Administration (CNIPA) on May 19, 2022, the content of which is hereby incorporated by reference in its entirety.

TECHNICAL FIELD

The present disclosure relates to the technical field of electronic radio frequency tags, and in particularly, to a radio frequency identification (RFID) switch tag.

DESCRIPTION OF RELATED ART

At present, a RFID technology uses electromagnetic fields to transmit data wirelessly. One of main uses of the RFID technology is to automatically identify and track objects through a RFID tag, which can be attached or incorporated into various objects. For example, the various objects include credit cards, passports, license plates, identification (ID) cards, cell phones/mobile devices, etc. The RFID technology can also be applied in many fields including but not limited to electronic toll collection, parking charges, border control, payment processing, asset management and transportation. For example, a license plate that includes the RFID tag can be used for electronic toll collection (ETC), electronic vehicle registration (EVR), transit and other purposes.

Different RFID applications may require different operating frequencies. For example, ultra-high frequency (UHF) reader and transponder tags (e.g., operating at a frequency of 915 megahertz (MHz) or 2.45 gigahertz (GHz)) provide greater read ranges and faster data transfer rates, and thus are usually deployed in ETC systems. Further, contactless payment systems can be implemented using high frequency (HF) or near-field communication (NFC) readers and transponders (e.g., operating at a frequency of 13.56 MHz), which usually exhibit greater field penetration than UHF systems. However, configurations of conventional RFID tags have limited flexibility in supporting the operation of multiple frequencies.

A Chinese patent application No. 202110448629.2, filed on Apr. 25, 2021, publicized on Jul. 30, 2021, and titled "ANTENNA DEVICE, ELECTRONIC TAG APPARATUS AND COMMUNICATION SYSTEM", discloses an antenna device, an electronic tag apparatus and a communication system. The antenna device includes an array substrate, an antenna radiator and a feed source. The array substrate is provided with an antenna area covering a geometric center thereof. The antenna radiator is arranged in the antenna area and includes a first radiating part and a second radiating part which are arranged at intervals along a first direction. An end of the first radiating part is grounded, another end of the first radiating part is opposite to an end of the second radiating part, and another end of the second radiating part is grounded. The feed source is arranged on the array substrate and electrically connected with the first radiating part and the second radiating part to excite the first radiating part to generate a first resonance in an ultra-wideband frequency band and excite the second radiating part to generate a second resonance in the ultra-wideband frequency band. A main radiation beam of the antenna device is symmetrical with respect to a central axis of the antenna radiator along the first direction, and the antenna radiator has a high cross polarization ratio in the first direction, so that the accuracy of distance measurement and angle measurement by the antenna device is higher.

However, even though the above-mentioned patent application document discloses an electronic tag apparatus, but the electronic tag apparatus has no complete function, is low in intelligence and practicability, and can be applied in limited scenarios, thereby not meeting the requirements of social development.

SUMMARY

An objective of the present disclosure is to provide a RFID switch tag, which may have complete functions, be detachable and convenient in use, and can be applied in various scenarios.

In a first aspect, an embodiment of the present disclosure provides a RFID switch tag, including: a housing; a detachable card, comprising: a booster antenna, and at least one ultra-high frequency RFID module uncoupled to the booster antenna when the detachable card is detached from the housing; and a coupling coil, configured to couple the booster antenna with one of the at least one ultra-high frequency RFID module when the detachable card is attached to the housing.

In an exemplary embodiment of the present disclosure, the at least one ultra-high frequency RFID module is one ultra-high frequency RFID module, the coupling coil is attached to a position on an inner side of the housing and thereby the one ultra-high frequency RFID module is coupled with the booster antenna by the coupling coil once the detachable card is accommodated into the housing.

In an embodiment of the present disclosure, the at least one ultra-high frequency RFID module is multiple ultra-high frequency RFID modules, the coupling coil is connected with a slider, the slider is slidable relative to the housing to make the coupling coil move relative to the detachable card accommodated in the housing and thereby selectably couple one of the multiple ultra-high frequency RFID modules with the booster antenna.

In an exemplary embodiment of the present disclosure, a side wall of the housing is provided with an opening, the coupling coil is disposed on an inner side of the housing and the slider is arranged to protrude out from the opening, and the detachable card is disposed at a side of the coupling coil facing away from the side wall when the detachable card is attached to the housing.

In an exemplary embodiment of the present disclosure, each of the multiple ultra-high frequency RFID modules includes a RFID tag chip and leads connected with the RFID tag chip, and the RFID tag chips of the multiple ultra-high frequency RFID modules respectively are stored with different groups of tag data, and each group of data in the different groups of tag data include an electronic product code (EPC) and a tag identifier (TID).

In an exemplary embodiment of the present disclosure, the detachable card further includes: a near-field communication coil and a near-field communication chip coupled to the near-field communication coil.

In an exemplary embodiment of the present disclosure, the booster antenna, the at least one ultra-high frequency RFID module, and the near-field communication module are disposed in a region surrounded by the near-field communication coil.

In an exemplary embodiment of the present disclosure, the detachable card is disposed with a bank card chip, and the bank card chip is located in a region surrounded by near-field communication coil.

In an exemplary embodiment of the present disclosure, each of the at least one ultra-high frequency RFID module is operative at a frequency of 915 megahertz (MHz) or 2.45 gigahertz (GHz).

In an embodiment of the present disclosure, the near-field communication chip is operative at a frequency of 13.56 MHz.

In a second aspect, an embodiment of the present disclosure provides a RFID switch tag, including: a base; a detachable card, including: a booster antenna, and multiple ultra-high frequency RFID modules uncoupled to the booster antenna when the detachable card is detached from the base; and a movable coupler, being movably disposed on the base and configured to inductively and/or capacitively couple the booster antenna selectably with one of the multiple ultra-high frequency RFID modules when the detachable card is attached to the base.

In an exemplary embodiment of the present disclosure, the multiple ultra-high frequency RFID modules are respectively stored with different groups of tag data, and each group of data of the different groups of tag data comprises an electronic product code (EPC) and a tag identifier (TID).

In an embodiment of the present disclosure, the detachable card further includes a near-field communication coil, a near-field communication chip coupled to the near-field communication coil, and a bank card chip; and the bank card chip, the near-field communication chip, the booster antenna, and the multiple ultra-high frequency RFID modules are located in a region surrounded by the near-field communication coil.

In an exemplary embodiment of the present disclosure, the movable coupler includes a substrate, a coupling coil disposed on the substrate, and a slider connected with the substrate; and the slider is operatively movable relative to the base to drive the coupling coil through the substrate to move relative to the base In an exemplary embodiment of the present disclosure, the base is a housing, a side wall of the base is provided with an opening, the movable coupler is disposed on an inner side of the base, the slider is arranged to protrude out from the opening, and the detachable card is disposed at a side of the coupling coil facing away from the side wall when the detachable card is attached to the base.

In an exemplary embodiment of the present disclosure, each of the multiple ultra-high frequency RFID modules comprises a RFID tag chip and leads connected with the RFID tag chip.

In an embodiment of the present disclosure, each of the multiple ultra-high frequency RFID module is operative at a frequency of 915 megahertz (MHz) or 2.45 gigahertz (GHz).

In an embodiment of the present disclosure, the near-field communication chip is operative at a frequency of 13.56 MHz.

The present disclosure may have at least one of the following beneficial effects. 1) The detachable card is detachable from the housing, therefore, the detachable card is easier to be replaced during the use of the RFID switch tag, and thus more types of detachable cards can be used, which is convenient for an user of the RFID switch tag. 2) The detachable card is provided with at least one ultra-high frequency RFID module, therefore, an accuracy of identification of the detachable card is higher than a conventional high frequency RFID module. 3) The detachable card is provided with not only at least one ultra-high frequency RFID module, but also the near-field communication chip, and the bank card chip, therefore, the RFID switch tag can be applied widely in various scenarios. 4) The slider is arranged to slidable relative to the housing to make the coupling coil move relative to the detachable card accommodated in the housing and thereby selectably couple one of the multiple ultra-high frequency RFID modules with the booster antenna, therefore, an operation of the RFID switch tag is convenient. 5) The RFID switch tag has three ultra-high frequency RFID modules, the three ultra-high frequency RFID modules can used for three different occupancy vehicle lanes including a single occupancy vehicle lane, a high occupancy vehicle lane, and a super occupancy vehicle lane, and the three different occupancy vehicle lanes correspond to different charge discounts. As such, it is merely required one RFID switch tag to apply to three travel conditions, rather than three tags for the three travel conditions, thereby simplifying the operation of the user.

BRIEF DESCRIPTION OF THE DRAWINGS

In order to explain embodiments of the present disclosure more clearly, accompanying drawings that need to be used in the description of the embodiments are briefly introduced hereinafter. It is apparent that the accompanying drawings in the following description are merely some embodiments of the present disclosure, and for the skilled in the art, other drawings can also be obtained according to the structures shown in these introduced drawings without creative efforts.

DESCRIPTION OF REFERENCE NUMERALS

100—housing (base); 102—opening; 200—detachable card; 202—booster antenna; 204—ultra-high frequency RFID module; 2042—RFID tag chip; 2044—lead; 206—near-field communication chip; 208—near-field communication coil; 210—bank card chip; 300—movable coupler; 302—coupling coil; 304—substrate; 306—slider; 500—RFID switch tag.

DETAILED DESCRIPTION OF EMBODIMENS

Technical solutions in embodiments of the present disclosure will be clearly and completely described below combined with the accompanying drawings in the embodiments of the present disclosure. It is apparent that the described embodiments are merely part of embodiments of the present disclosure, not all of the embodiments of the embodiments. Based on the described embodiments of the present disclosure, all other embodiments obtained by the skilled in the art without creative efforts shall fall within the scope of protection of the present disclosure.

Figure 1:
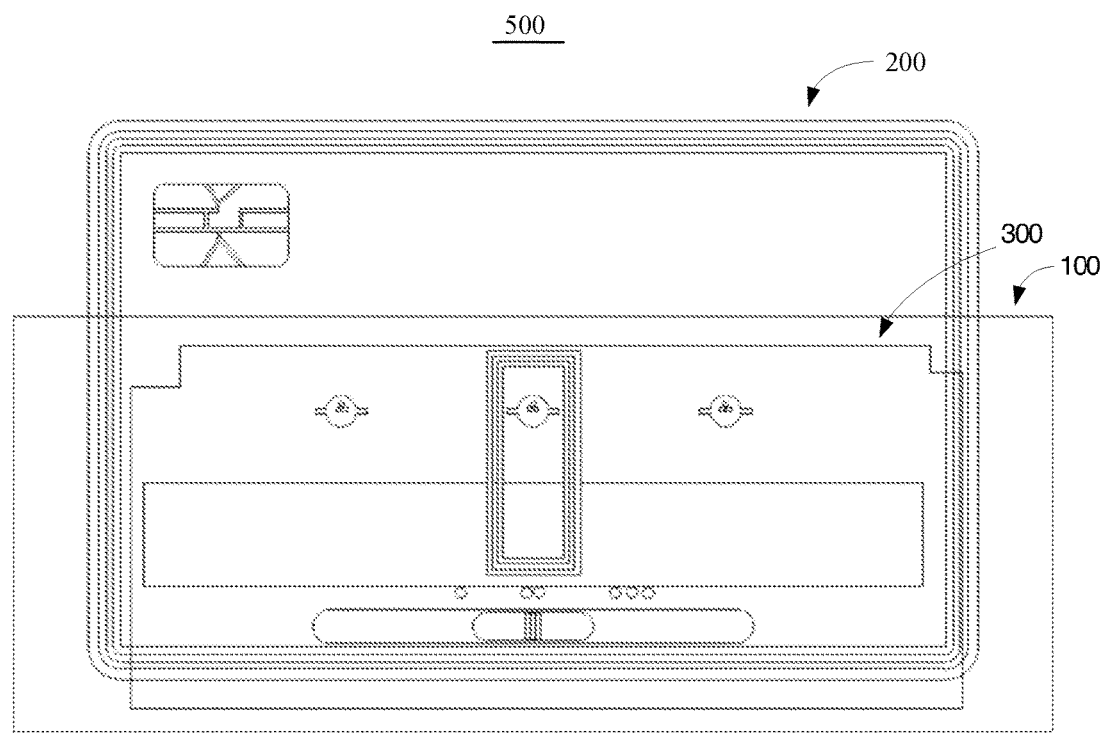
FIG. 1 illustrates a schematic structural plane view of a RFID switch tag including three ultra-high frequency RFID modules according to an embodiment of the present disclosure.

Referring to FIG. 1, a RFID switch tag 500 is shown according to an embodiment of the present disclosure. The RFID switch tag 500 includes a housing 100, a detachable card 200, and a movable coupler 300. The housing 100, the detachable card 200, and the movable coupler 300 are separated from each other, and the detachable card 200 and the movable coupler 300 can be accommodated in the housing 100. It should be noted that, since the detachable card 200 is detachable from the housing 100, the detachable card 200 is easier to be changed during the use of the RFID switch tag 500, and thus more types of detachable cards 200 can be used, which is convenient for an user of the RFID switch tag 500.

Figure 2:
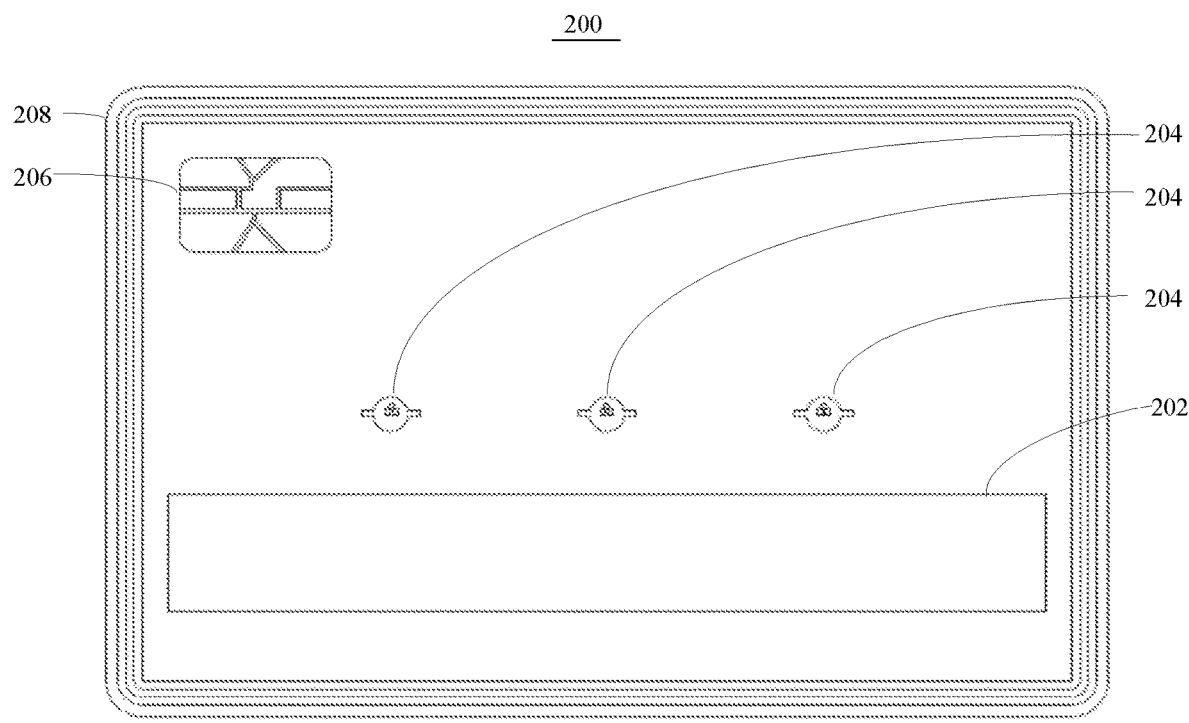
FIG. 2 illustrates a schematic structural plane view of a detachable card in FIG. 1 according to an embodiment of the present disclosure.

Specifically, in the embodiment of the present disclosure, as shown in FIG. 2, the detachable card 200 includes a booster antenna 202 and three ultra-high frequency (UHF) RFID modules 204. The booster antenna 202 and the three ultra-high frequency RFID modules 204 are arranged spaced from each other. The booster antenna 202 does not couple with any one of the three ultra-high frequency RFID modules 204, when the detachable card 200 is detached from the housing 100. For example, the booster antenna 202 may be a UHF booster, which may include a passive booster, an active booster, or a battery-assisted passive booster, which is not limited herein. Each of the three ultra-high frequency RFID modules 204 is operative at a frequency of 915 megahertz (MHz) or 2.45 gigahertz (GHz). It should be noted that, since the detachable card 200 is provided with the ultra-high frequency RFID module 204, an accuracy of identification of the detachable card 200 is higher than a conventional high frequency (HF) RFID module.

Figure 5:
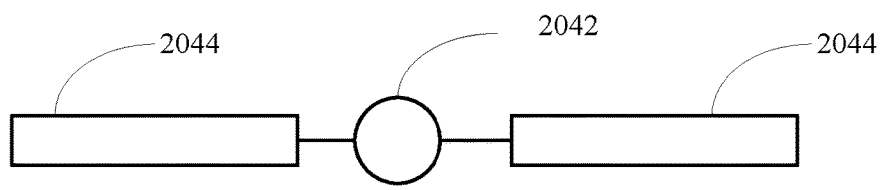
FIG. 5 illustrates a schematic structural plane view of an ultra-high frequency RFID module in FIG. 1 according to an embodiment of the present disclosure.

Further, as shown in FIG. 5, each of the three ultra-high frequency RFID modules 204 includes a RFID tag chip 2042 and leads 2044 connected with the RFID tag chip 2042. The RFID tag chips 2042 of the three ultra-high frequency RFID modules 204 respectively are stored with different groups of tag data, and each group of data in the different groups of tag data include an electronic product code (EPC) and a tag identifier (TID). In an illustrated embodiment, the TIDs of the different groups of tag data may include multiple account information corresponding to different occupancy vehicle lanes respectively. In some embodiments of the present disclosure, the three ultra-high frequency RFID modules 204 can used for three different occupancy vehicle lanes including a single occupancy vehicle lane, a high occupancy vehicle lane, and a super occupancy vehicle lane, and the three different occupancy vehicle lanes correspond to different discounts. As such, it is merely required one RFID switch tag to apply to three travel conditions, rather than three tags for the three travel conditions, thereby simplifying the operation of the user.

Figure 3:
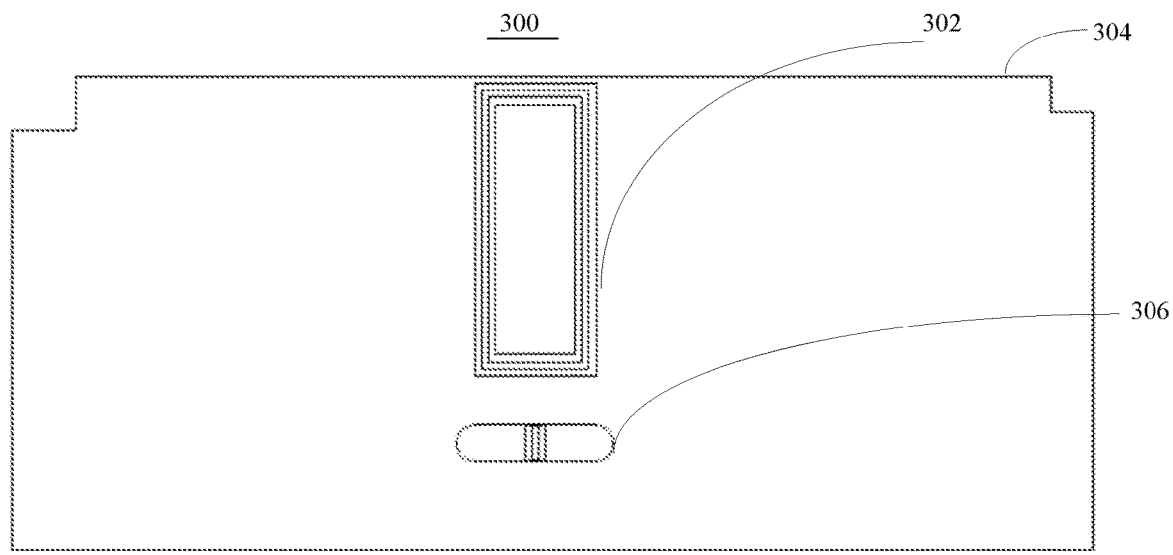
FIG. 3 illustrates a schematic structural plane view of a moveable coupler in FIG. 1 according to an embodiment of the present disclosure.

Further, as shown in FIG. 3, the movable coupler 300 includes: a substrate 304, a coupling coil 302 disposed on the substrate 304, and a slider 306 connected with the substrate 304. The substrate 304 is configured to provide structural supports for the coupling coil 302 and the slider 306, and a material of the substrate 304 is not limited herein, as long as the substrate 304 can provide the structural supports.

Figure 4:
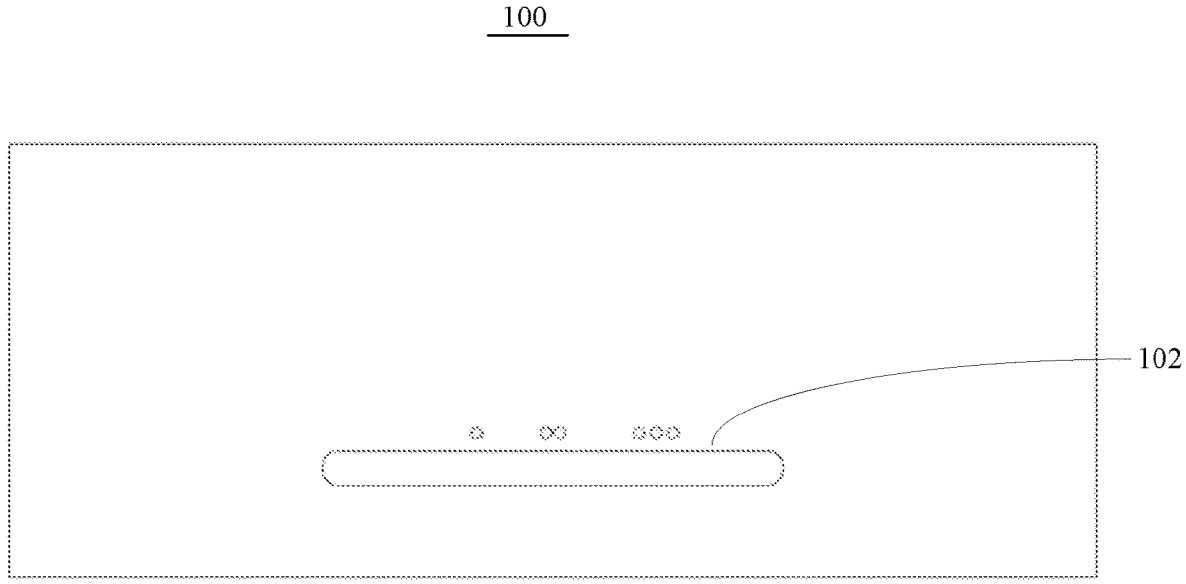
FIG. 4 illustrates a schematic structural plane view of a housing in FIG. 1 according to an embodiment of the present disclosure.

Moreover, as shown in FIGS. 1 and 4, a side wall of the housing 100 is provided with an opening 102, the movable coupler 300 is disposed on an inner side of the housing 100 and the slider 306 is arranged to protrude out from the opening 102, and the detachable card 200 is disposed at a side of the coupling coil 302 facing away from the side wall when the detachable card 200 is attached to the housing 100. Specifically, when the detachable card 200 and the movable couple 300 are received in the housing 100, the slider 306 can be slid relative to the housing 100, to make the coupling coil 302 move relative to the detachable card 200 or to drive the coupling coil 302 through the substrate 304 to move relative to the housing 100, and thereby selectably couple one of the three ultra-high frequency RFID modules 204 with the booster antenna 202.

In an exemplary embodiment of the present disclosure, as shown in FIG. 2, the detachable card 200 further includes a near-field communication (NFC) coil 208 and a near-field communication chip 206 coupled to the near-field communication coil 208. The NFC chip 206 can communicate within a certain distance, and the NFC coil 208 further improve a communication strength of the NFC chip 206. The NFC chip 206 is operative at a frequency of 13.56 MHz. The booster antenna 202, the three ultra-high frequency RFID modules 204, and the near-field communication chip 206 are disposed in a region surrounded by the near-field communication coil 208. It should be noted, a coupling effect principle of the booster antenna 202 and the ultra-high frequency RFID module 204 can refer to a U.S. patent application Ser. No. 16/677,663, which is not repeated herein.

Figure 6:
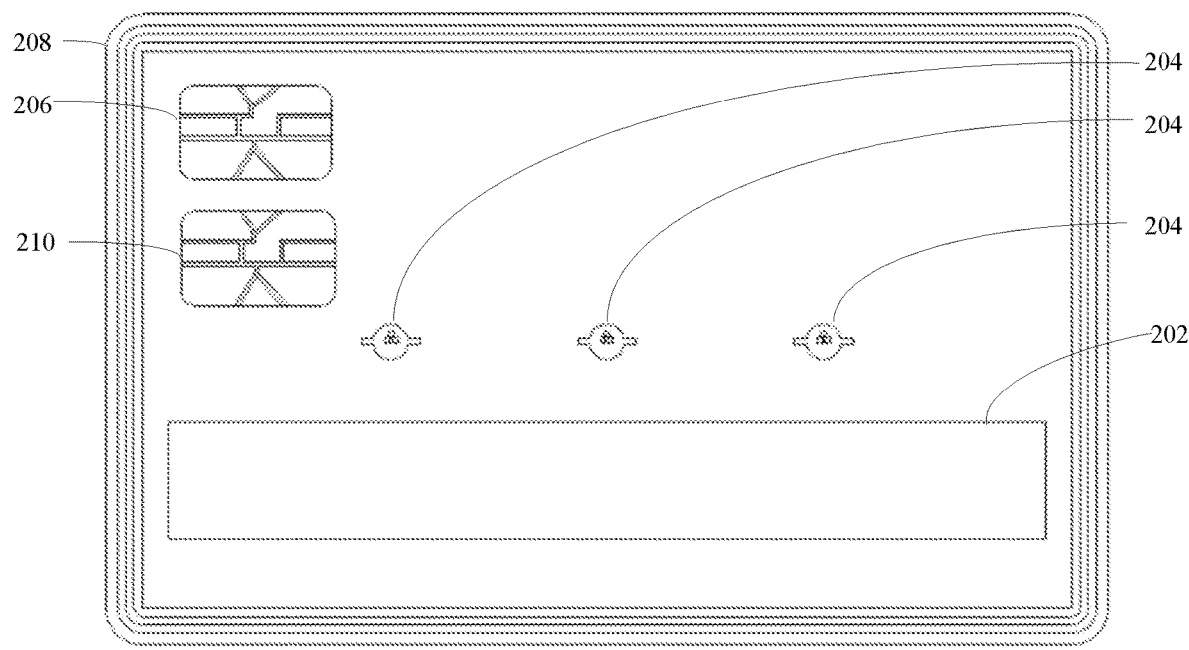
FIG. 6 illustrates a schematic structural plane view of another detachable card according to an embodiment of the present disclosure.
Figure 7:
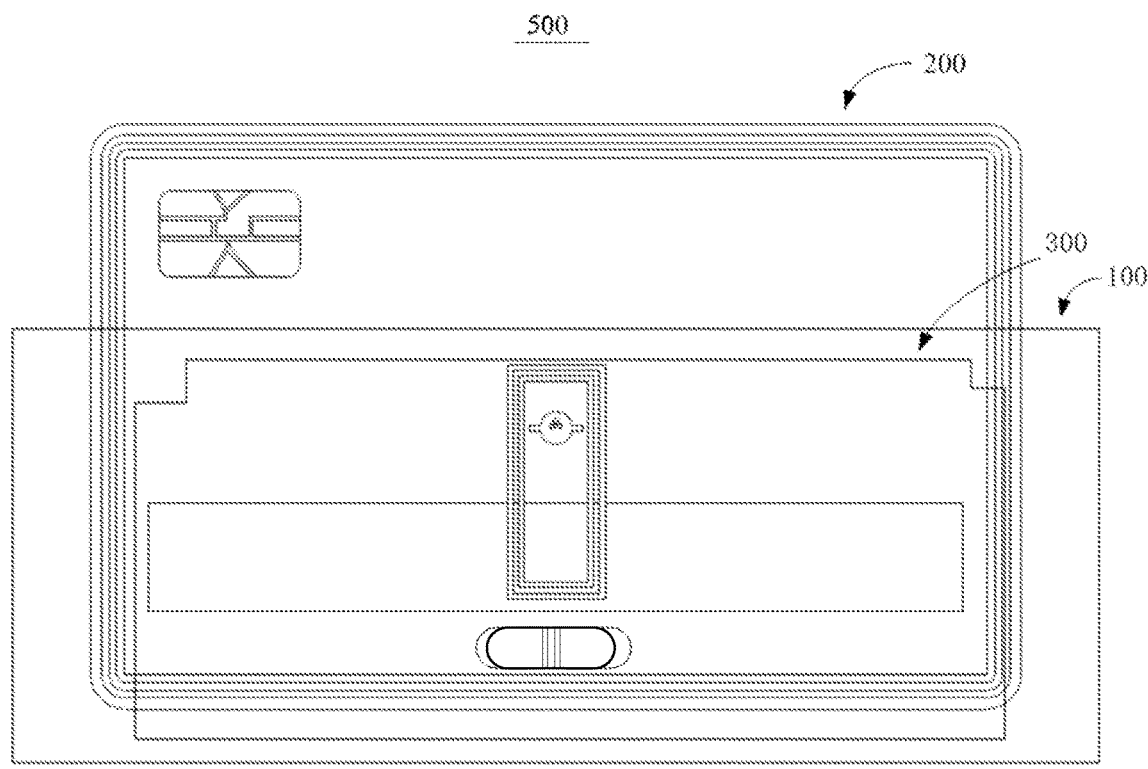
FIG. 7 illustrates a schematic structural plane view of a RFID switch tag including one ultra-high frequency RFID module according to an embodiment of the present disclosure.
Figure 8:
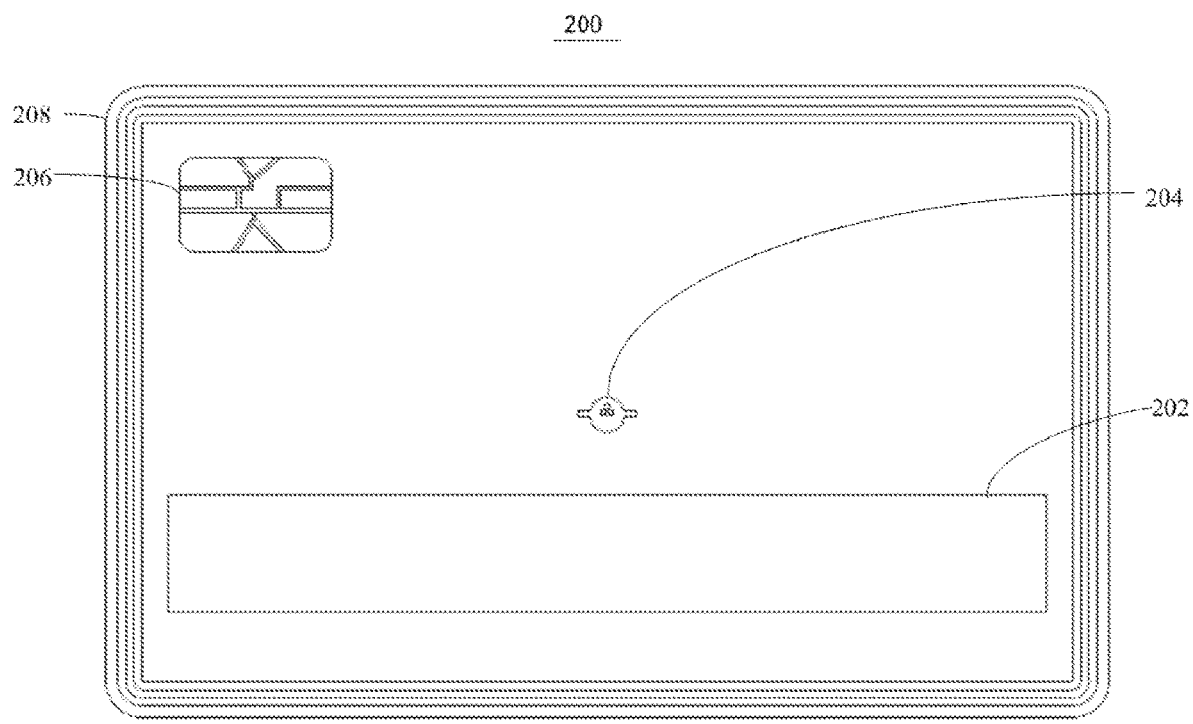
FIG. 8 illustrates a schematic structural plane view of a detachable card in FIG. 7 according to an embodiment of the present disclosure.
Figure 9:
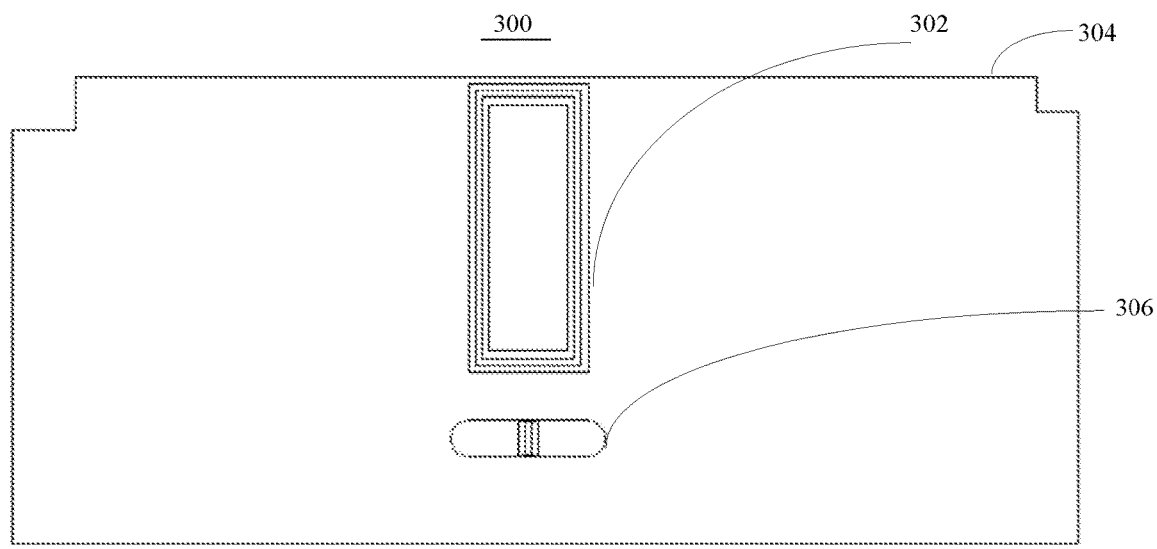
FIG. 9 illustrates a schematic structural plane view of a moveable coupler in FIG. 7 according to an embodiment of the present disclosure.
Figure 10:
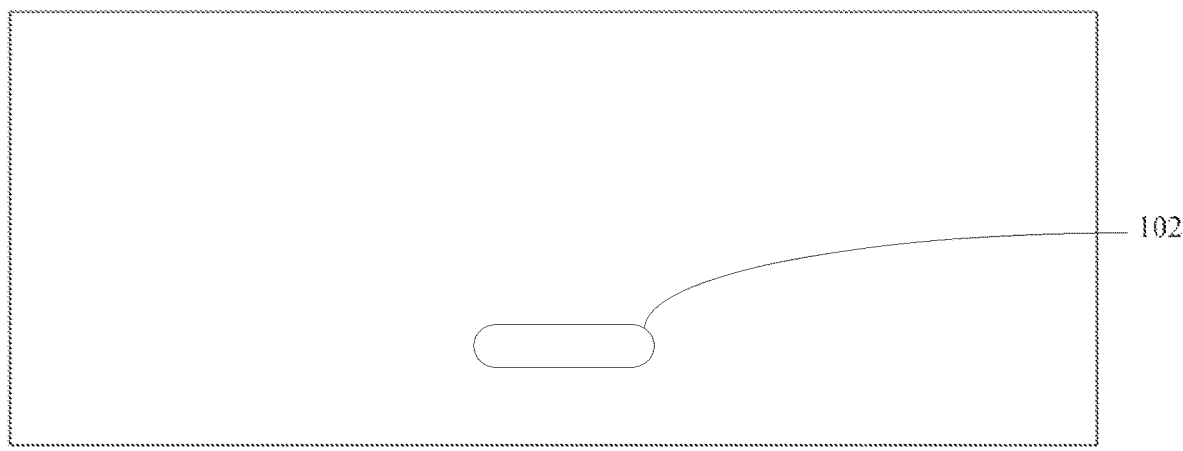
FIG. 10 illustrates a schematic structural plane view of a housing in FIG. 7 according to an embodiment of the present disclosure.
Figure 11:
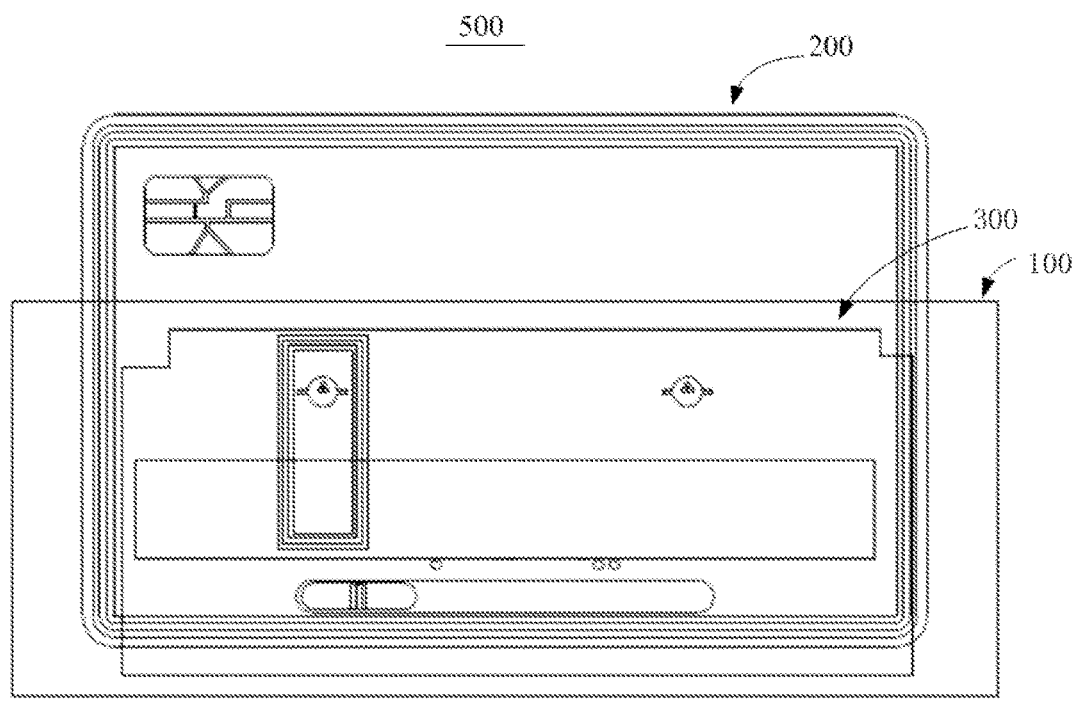
FIG. 11 illustrates a schematic structural plane view of a RFID switch tag including two ultra-high frequency RFID modules according to an embodiment of the present disclosure.
Figure 12:
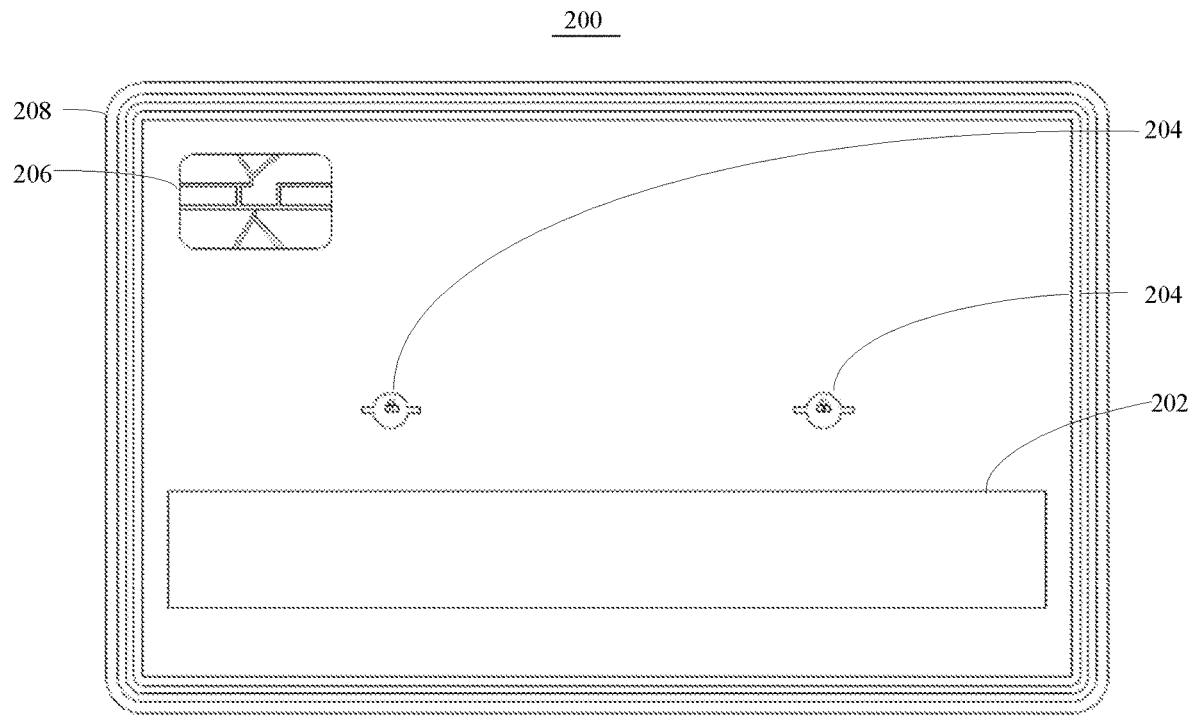
FIG. 12 illustrates a schematic structural plane view of a detachable card in FIG. 11 according to an embodiment of the present disclosure.
Figure 13:
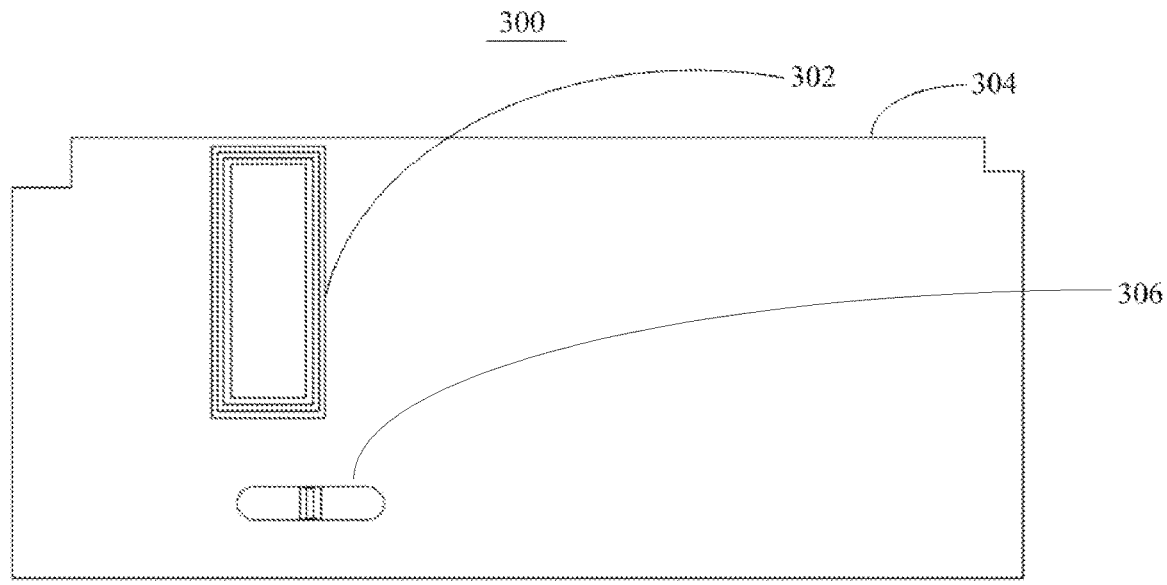
FIG. 13 illustrates a schematic structural plane view of a moveable coupler in FIG. 11 according to an embodiment of the present disclosure.
Figure 14:
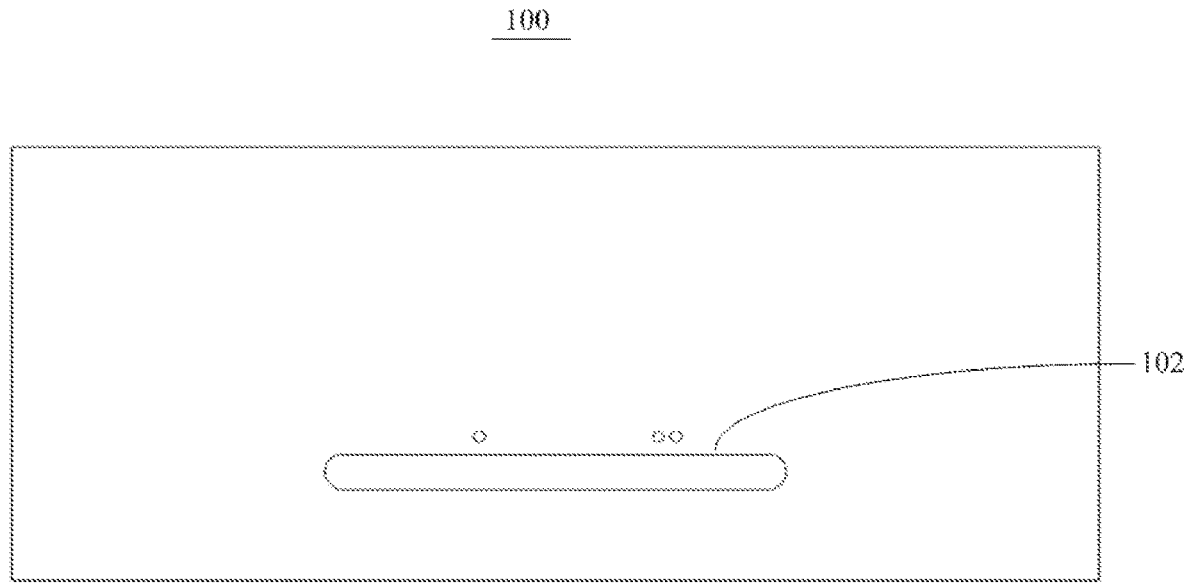
FIG. 14 illustrates a schematic structural plane view of a housing in FIG. 11 according to an embodiment of the present disclosure.

In an exemplary embodiment of the present disclosure, as shown in FIG. 6, the detachable card 200 is disposed with a bank card chip 210, and the bank card chip 210 is located in the region surrounded by near-field communication coil 208. When the RFID switch tag 500 is used, the bank card chip 210 can be used as a bank card for payment, which greatly facilitates user's consumption life. It should be noted that, since the detachable card 200 is provided with not only the ultra-high frequency RFID modules 204, but also the near-field communication chip 208, and the bank card chip 210, the RFID switch tag 500 can be applied widely in various scenarios.

In the above embodiments, the detachable card 200 is provided with the three ultra-high frequency RFID modules 204, however, a quantity of the ultra-high frequency RFID module 204 is not limited herein, and the detachable card 200 may provided with one ultra-high frequency RFID module 204 (as shown in FIGS. 7-10), two ultra-high frequency RFID modules 204 (as shown in FIGS. 11-14), or more than three ultra-high frequency RFID modules 204. It should be noted that, in a case that the detachable card 200 is provided with only one ultra-high frequency RFID module 204, the substrate 304, the slider 306, and the opening 102 may also be omitted, and only the coupling coil 302 is required to be remained. Specifically, the coupling coil 302 is attached to a position on an inner side of the housing 100 and thereby the one ultra-high frequency RFID module 204 is coupled with the booster antenna 202 by the coupling coil 302 once the detachable card 200 is accommodated into the housing 100.

In an exemplary embodiment, the detachable card 200 includes a substrate, and the above-mentioned booster antenna 202, the ultra-high frequency RFID module 204, the near-field communication chip 206, the near-field communication coil 208 and the bank card chip 210 are arranged on the substrate. The substrate may be made of polyvinyl chloride (PVC), which is not easy to be damaged, which prolonging the service life of the detachable card 200. Further, a size of the detachable card can be designed according to actual requirements.

In addition, an embodiment of the present disclosure provides a RFID system, which include a RFID interrogator, and the RFID switch tag 500. Data can be exchanged between the RFID interrogator and RFID switch tag 500 via radio transmit signal and radio receive signal. The RFID interrogator may include a RF transceiver, which contains transmitter and receiver electronics, and an antenna, which is configured to generate and receive the radio transit signal and the radio receive signal, respectively. Exchange of data can be accomplished via electromagnetic or electrostatic coupling in the RF spectrum in combination with various modulation and encoding solutions.

In an exemplary embodiment, the RFID switch tag 500 can serve as a windshield tag. In this embodiment, the housing 100 of RFID switch tag 500 can be attached to a vehicle's windshield using, for example, adhesives (e.g., adhesive strips). When the RFID switch tag 500 is used as a windshield tag, the RFID switch tag 500 can be used in various electronic toll collection (ETC) applications. For example, when the RFID switch tag 500 is placed on a windshield with both the housing 100 with the coupling coil 302 thereon and the detachable card 200, the at least one UHF module 204 in the detachable card 200 is coupled with the booster antenna 202 in the detachable card 200 via the coupling coil 302 to form an UHF system having desired performances, such as a long operating range; however, when the detachable card 200 is separated from the housing 100 and the windshield, the housing 100 can remain on the windshield but the at least one UHF module 204 in the detachable card 200 is no longer coupled to the booster antenna 202 in the detachable card 200. As a result, the at least one UHF module and booster antenna 202 in the detachable card 200 without attaching to the housing 100 with the coupling coil 302 thereon can be able to achieve the intended functionality of the UHF system, i.e., the UHF module 204 is disabled.

Notably, a HF RFID tag such as the NFC chip within the detachable card 200 can remain functional when the detachable card 200 is separated from the housing 100. As such, the detachable card 200 detached from the housing 100 can be used exclusively as an HF RFID tag, such as the NFC tag (e.g., for making contactless payments). When used as the NFC tag, the detachable card 200 can be configured with a shape and dimensions (including width, height, and thickness) so that it is sufficiently durable and can be conveniently placed inside a wallet, a purse, or a protective cover of a portable electronic device, such as a smartphone, a tablet, or an iPad™. Dimensions of the detachable card 200 can be significantly greater than that of a typical RFID tag. In some embodiments, a rectangular shape having a size and a thickness that resembles a credit card is preferred. When detached from the housing 100, the detachable card 200 can be use in a "tap and go" manner in various NFC applications without being taken out of a wallet, a purse, or a protective cover of a portable electronic device where the detachable card 200 is stored and carried around. In various embodiments, the detachable card 200 is configured as a laminated card so that it is sufficiently durable through extensive uses as a standalone card. In some embodiments, the detachable card 200 is configured with a hard case to provide additional durability and protection.

In some embodiments, the RFID switch tag 500 is used in various ETC applications. For example, the at least one UHF RFID module in the RFID switch tag 500 can be configured to be used in high occupancy vehicle (HOV) lanes, while the HF RFID tag (i.e., the NFC tag) in the RFID switch tag 500 can be configured to be used in single occupancy vehicle (SOV) lanes. Hence, by switching detaching the detachable card 200 between the detached configuration of the RFID switch tag 500 and the attached configuration of the RFID switch tag 500, the RFID switch tag 500 permits a driver to switch between HOV operations and SOV operations using the RFID switch tag 500. In such embodiments, the RFID switch tag 500 can include a switching mechanism that allows the user to switch between the UHF and HF tags as required.

In certain embodiments, the detachable card 200 including the near-field communication chip 206 can actually take the form of a card for use in an, e.g., NFC application. For example, the card could be a transit card used to access public transit. The card can be modified as described herein, to include at least one UHF module 204 that can be couple to the booster antenna 202 when the transit card is inserted into the housing 100. The housing 100 may be provided with a slot configured to receive detachable card 200. When detachable card 200 is inserted in the slot, a UHF "tag" is formed that can, e.g., function within a tolling environment.

The RFID switch tag disclosed herein can be applied wireless communication devices incorporating HF and/or UHF RFID reader capabilities. The various components illustrated in the accompanying drawings may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of the present disclosure.

What is claimed is:

1. A radio frequency identification (RFID) switch tag, comprising:

a housing;
a detachable card, comprising: a booster antenna, and at least one ultra-high frequency RFID module uncoupled to the booster antenna when the detachable card is detached from the housing; and
a coupling coil, configured to couple the booster antenna with one of the at least one ultra-high frequency RFID module when the detachable card is attached to the housing.

2. The RFID switch tag according to claim 1, wherein the at least one ultra-high frequency RFID module is one ultra-high frequency RFID module, the coupling coil is attached to a position on an inner side of the housing and thereby the one ultra-high frequency RFID module is coupled with the booster antenna by the coupling coil once the detachable card is accommodated into the housing.

3. The RFID switch tag according to claim 1, wherein the at least one ultra-high frequency RFID module is multiple ultra-high frequency RFID modules, the coupling coil is connected with a slider, the slider is slidable relative to the housing to make the coupling coil move relative to the detachable card accommodated in the housing and thereby selectably couple one of the multiple ultra-high frequency RFID modules with the booster antenna.

4. The RFID switch tag according to claim 3, wherein a side wall of the housing is provided with an opening, the coupling coil is disposed on an inner side of the housing and the slider is arranged to protrude out from the opening, and the detachable card is disposed at a side of the coupling coil facing away from the side wall when the detachable card is attached to the housing.

5. The RFID switch tag according to claim 3, wherein each of the multiple ultra-high frequency RFID modules comprises a RFID tag chip and leads connected with the RFID tag chip, and the RFID tag chips of the multiple ultra-high frequency RFID modules respectively are stored with different groups of tag data, and each group of data in the different groups of tag data comprise an electronic product code (EPC) and a tag identifier (TID).

6. The RFID switch tag according to claim 1, wherein the detachable card further comprises: a near-field communication coil and a near-field communication chip coupled to the near-field communication coil.

7. The RFID switch tag according to claim 6, wherein the booster antenna, the at least one ultra-high frequency RFID module, and the near-field communication module are disposed in a region surrounded by the near-field communication coil.

8. The RFID switch tag according to claim 6, wherein the detachable card is disposed with a bank card chip, and the bank card chip is located in a region surrounded by the near-field communication coil.

9. The RFID switch tag according to claim 6, wherein the near-field communication chip is operative at a frequency of 13.56 MHz.

10. The RFID switch tag according to claim 1, wherein each of the at least one ultra-high frequency RFID module is operative at a frequency of 915 megahertz (MHz) or 2.45 gigahertz (GHz).

11. A radio frequency identification (RFID) switch tag, comprising:
a base;
a detachable card, comprising: a booster antenna, and a plurality of ultra-high frequency RFID modules uncoupled to the booster antenna when the detachable card is detached from the base; and
a movable coupler, being movably disposed on the base and configured to inductively or capacitively couple the booster antenna selectably with one of the plurality of ultra-high frequency RFID modules when the detachable card is attached to the base.

12. The RFID switch tag according to claim 11, wherein the plurality of ultra-high frequency RFID modules are respectively stored with different groups of tag data, and each group of data of the different groups of tag data comprises an electronic product code (EPC) and a tag identifier (TID).

13. The RFID switch tag according to claim 11, wherein the detachable card further comprises a near-field communication coil, a near-field communication chip coupled to the near-field communication coil, and a bank card chip; and
wherein the bank card chip, the near-field communication chip, the booster antenna, and the plurality of ultra-high frequency RFID modules are located in a region surrounded by the near-field communication coil.

14. The RFID switch tag according to claim 13, wherein the near-field communication chip is operative at a frequency of 13.56 MHz.

15. The RFID switch tag according to claim 11, wherein the movable coupler comprises a substrate, a coupling coil disposed on the substrate, and a slider connected with the substrate; and
wherein the slider is operatively movable relative to the base to drive the coupling coil through the substrate to move relative to the base.

16. The RFID switch tag according to claim 15, wherein the base is a housing, a side wall of the base is provided with an opening, the movable coupler is disposed on an inner side of the base, the slider is arranged to protrude out from the opening, and the detachable card is disposed at a side of the coupling coil facing away from the side wall when the detachable card is attached to the base.

17. The RFID switch tag according to claim 11, wherein each of the plurality of ultra-high frequency RFID modules comprises a RFID tag chip and leads connected with the RFID tag chip.

18. The RFID switch tag according to claim 11, wherein each of the plurality of ultra-high frequency RFID module is operative at a frequency of 915 megahertz (MHz) or 2.45 gigahertz (GHz).

* * * * *